Nov. 17, 1953 F. H. BRICKNER 2,659,532

SLIDE-TYPE CALCULATOR

Filed June 9, 1952 4 Sheets-Sheet 1

FRANK H. BRICKNER,
INVENTOR.

HUEBNER, BEEHLER,
WORREL & HERZIG,
ATTORNEYS.

BY Warren T. Jessup

Nov. 17, 1953 F. H. BRICKNER 2,659,532

SLIDE-TYPE CALCULATOR

Filed June 9, 1952 4 Sheets-Sheet 2

FRANK H. BRICKNER,
INVENTOR.

HUEBNER, BEEHLER,
WORREL & HERZIG,
ATTORNEYS.

BY Warren T. Jessup

Nov. 17, 1953 F. H. BRICKNER 2,659,532

SLIDE-TYPE CALCULATOR

Filed June 9, 1952 4 Sheets-Sheet 3

FRANK H. BRICKNER,
INVENTOR.

HUEBNER, BEEHLER,
WORREL & HERZIG,
ATTORNEYS.

BY Warren T. Jessup

SLIDE-TYPE CALCULATOR

Filed June 9, 1952 4 Sheets-Sheet 4

FRANK H. BRICKNER,
INVENTOR.

HUEBNER, BEEHLER,
WORREL & HERZIG,
ATTORNEYS.
BY
Warren T. Jessup

Patented Nov. 17, 1953 2,659,532

UNITED STATES PATENT OFFICE 2,659,532

SLIDE-TYPE CALCULATOR

Frank H. Brickner, Newport Beach, Calif.

Application June 9, 1952, Serial No. 292,410

12 Claims. (Cl. 235—89)

This invention relates to calculators, and more particularly to calculators for ascertaining the monthly interest due on any amount of principal at a predetermined annual interest rate.

It is an object of this invention to provide an interest calculator in which, for a predetermined interest rate, the principal may be inserted into the calculator, and the interest read directly, without requiring ancillary calculations on the part of the operator.

It is another object to provide a simple calculator of the movable slide type, made of any sheet material such as cardboard, metal, or plastic, by which may be ascertained a predetermined function of a variable number, and in which the variable number may be inserted into the calculator by proper slide setting and the function read off directly, without ancillary calculations or subsequent repositioning of any slide.

It is a further object of this invention to provide a simple interest calculator of the flat, movable-slide type, such as may be made of cardboard or plastic, in which the principal may be inserted into the calculator, and the interest read directly without ancillary calculations or repositioning of any slide.

In accordance with these and with other objects which will become apparent hereinafter, the instant invention will now be described.

Interest calculators of the flat, slide type have long been known in the art. They consist generally of a flat cardboard envelope having a plurality of windows in the cover, and several slides or sliders which may be moved so as to register their numbers with the windows in the cover. Such prior calculators, however, have the shortcoming of requiring ancillary calculations by the operator, generally additions. For example, a common form of such calculator has a first slider for the thousands portion of the principal, a second slider for the hundreds, a third for the tens, and a fourth for the units. By appropriate manipulation, the operator is able to ascertain how much interest is due on the thousands portion of the principal, how much on the hundreds, how much on the tens, and how much on the units. However, he must then add up the four interest portions to obtain the total.

In accordance with the instant invention, a flat, envelope-type calculator is provided in which no ancillary or after calculations are required. The operator causes the principal to be appropriately registered in the calculator, and then the interest is read off directly as a single total. This is made possible in the instant invention by the use of shutters secured laterally to the sliders, which shutters overlie the adjacent sliders so as to block out certain numbers on the said adjacent slider. The shutters have windows therein selectively positioned so as to allow only the proper figure to be read from the said adjacent slider. In this way correlation is achieved between adjacent digit columns, for example between the tens, and the hundreds and the units.

In general, this shutter modulation or control is required in order to allow the hundreds slider, for example, to control a reading which would normally appear on the tens slider. However, for complete uniqueness of answer, and to completely obviate requiring any subsequent repositioning of any slider, the hundreds slider is also provided with a second shutter which overlies the thousands slider above it. This shutter also has a pair of oppositely spaced elongate windows to selectively cover and uncover portions of the thousands slider. In this way, a particular reading on the hundreds slider is under the control of the positioning of three different sliders, namely, the hundreds slider itself, the thousands slider above it, and the tens slider below it.

A particular embodiment of the instant invention will now be described with reference to the accompanying drawings, wherein:

Fig. 7 is an exploded isometric view showing the various parts of the calculator.

Figure 2:
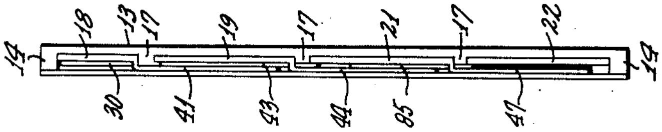
Fig. 2 is an end view.
Figure 1:
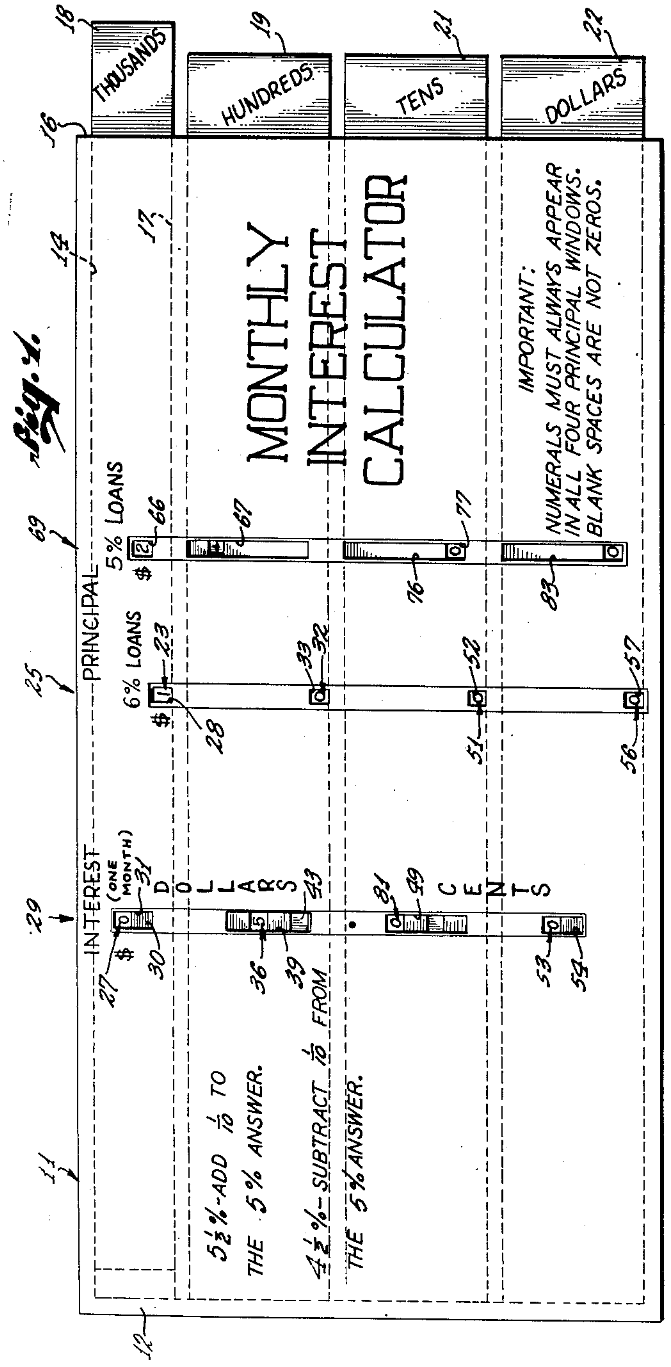
Fig. 1 is a plan view of the assembled calculator.

Referring to Fig. 1, 11 designates a flat rectangular envelope comprised principally of a cover 12 and a back 13. The cover 12 is spaced from the back 13 by edge walls 14, which enclose three edges of the envelope, leaving the fourth edge 16 open. The walls 14 may be formed integral with the back 13 if convenient, as would be the case where the device is made of plastic or resinous material. If made of cardboard, the walls are secured to the back 13, and the cover 12 is in turn secured at its edges to the walls 14, as shown in Fig. 2. Three elongate spacers 17 are secured to, or formed integral with, the back 13 within the envelope 11, and extend transversely away from the open edge 16 of the envelope. The spacers are not as high as the edge walls 14, so that a slight clearance is left between the top of the spacers 17 and the under side of the cover 12. The spacers 17 and walls 14 cooperate with the back 13 to form guideways or slideways for a plurality of flat elongate sliders 18, 19, 21, and 22. The slider 18 is the thousands slider, since it is the slider on which the thousands column of the principal is enumerated. Similarly, the slider 19 is the hundreds slider, the slider 21 is the tens slider, and the slider 22 is the units slider.

In the particular embodiment shown in the drawings, the calculator is capable of calculating interest for both 6% loans and 5% loans. Calculation of monthly interest at a 6% rate is much simpler arithmetically than at 5%, and this is reflected in a simpler construction of the calculator. Therefore, that portion of the calculator will first be described.

As shown in the drawings, the cover 12 has a first line 25 of four windows spaced thereacross transversely of the sliders. The windows in the line 25 are disposed to register with a respective one of the four sliders. Each window in the line 25 is of sufficient length to register with only one row of figures on each of the sliders. This is mentioned at this time because this characteristic of the 6% window of line 25 is different from the more complex 5% window line 69, where some of the windows must be made longer so as to register selectively with six rows on a slider.

An annual interest of 6% corresponds to a monthly interest of .5%. When .5 is multiplied with any number whatever, the answer must terminate in either zero or five. This fact simplifies the construction of the interest portion of the calculator for 6% calculations.

Figures 3, 4, 5:
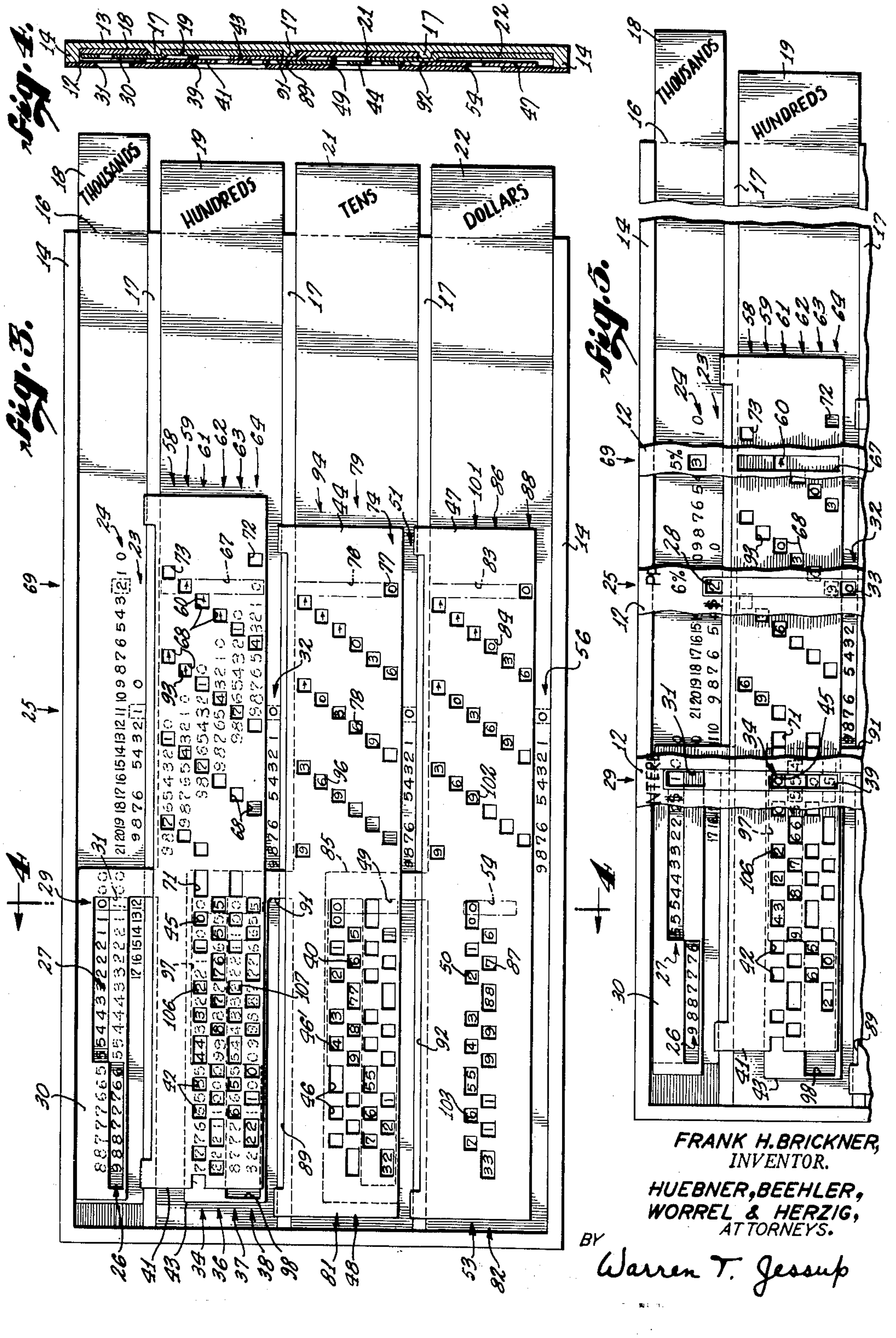
Fig. 3 is a view similar to Fig. 1, with the cover of the envelope removed to reveal the sliders disposed therein.
Fig. 4 is a cross section taken on line 4—4 of Fig. 3.
Fig. 5 is a fragmentary view with portions of the cover broken away to illustrate operation of the device.

Consider first the thousands slider 18 shown in Figs. 3 and 7. On this slider are placed four rows of numbers 23, 24, 26, and 27. Rows 23 and 24 are principal numbers, while rows 26 and 27 are interest numbers. Row 24 and row 26 happen to be aligned, but this is not essential to the construction of the calclulator, since the row 24 is a row of principal figures, and the row 26 is a row of interest figures. They are aligned simply to conserve space.

Only the rows 23 and 27 are used in the 6% principal calculations. Row 23 is positioned so that the figures therein may be selectively registered with the window 28 in the 6% line of windows 25. The line 25 is read from top to bottom, as are the other window lines in the calculator. Spaced from the 6% line of windows 25 and transversely of the sliders, is a line of interest windows 29 with which may be selectively registered the interest rows of numbers on the sliders. The first window 31 in this line is elongate so as to span both the row 26 and the row 27 of interest figures. For 6% calculations only the upper portion of the window 31, opposite the row 27, is employed, the lower portion being continuously covered by a shutter 30 to be described hereinafter.

The first window 31 in the line 29 of interest windows represents tens of dollars of interest. The rows 23 and 27 are so correlated on the slider 18 with the windows 28 and 31 that the digit appearing at the window 31 shows the number of tens of dollars of interest due for any given thousand dollars of principal appearing at window 28. For example, when the 1 in the row 23 is registered with the window 28, a 0 in the row 27 is registered with the window 31. This is because the interest on $1,999 is less than $10, and hence there is no possibility of anything more than a 0 being needed at the window 31. When the 2 in the row 23 is registered with the window 28, the first 1 in the row 27 is registered with the window 31, because the interest at 6% on $2,000 is $10, and the interest on $2,999 is less than $20.

The hundreds slider 19 is constructed in a manner somewhat similar to that of the thousands slider 18. The bottom row of figures 32 registers with the opening 33 in the cover, which is the second opening in the 6% window line 25. Although the slider 19 has six other rows of figures, 58, 59, 61, 62, and 63, they are not used in the 6% calculations, but are used only in the 5% calculations to be described hereinafter.

The slider 19 also has four rows of interest figures 34, 36, 37, and 38. Only the top two rows 34 and 36 are employed in the 6% calculations. The window 39 in the interest row of windows 29 in the cover is long enough to reveal each of the four rows 34, 36, 37, and 38, but the bottom two rows 37 and 38 are kept covered during the 6% calculations by a superjacent slider 43 to be described hereinafter. The principal numbers in the row 32 cooperate with the interest numbers in the row 34 in a manner substantially the same as the cooperation between the rows 23 and 27 on the slider 18.

Interrelation between the thousands slider 18 and the hundreds slider 19 is effected by the use of a shutter 41 which is secured laterally to (preferably formed integrally with) the slider 18. The shutter 41 overlies the slider 19, that is to say, is interposed between the slider 19 and the cover 12, as seen in Fig. 4. The shutter 41 does not cover any of the numbers in the row 32, but it does cover the interest rows 34 and 36. Shutter 41 has a plurality of windows 42 which may be selectively registered with the numbers in the rows 34 and 36. As seen in Figs. 3 and 7, the windows 42 are staggered so that a number in either the row 34 or the row 36 is exposed through the cover window 39, but both rows are never exposed at once.

The purpose of the shutter 41 is to reflect into the answer the effect, on the units column of the interest (window 39), of a change in the thousands column of the principal (window 23). At 6% this change occurs in multiples of five; and this fact simplifies the construction of the calculator, for it is only necessary to make each number in row 36 differ by five from the adjacent number in the row 34. Then, by the shutter 41, the appropriate unit dollars answer is uncovered either from the row 34 or the row 36.

For example, when all the sliders are positioned to the left, the number $0000 appears in the 6% window line 25, reading from top to bottom, and the number $00.00 appears in the interest window line 29. When the thousands slider 18 is moved to the right until the number 1 in row 23 appears at the window 28, the shutter 41 is caused to move so as to cover up the first 0 in the row 34, previously exposed through the window 39, and to uncover the adjacent number 5 in the row 36. Meanwhile, the first 0 in row 27 has been replaced by the third 0 in the row. This accordingly indicates an interest of $05.00 per month on a loan of $1,000 at 6%, which is the correct answer. Moving the thousands slider 18 further to the right until the number 2 in the row 23 is exposed through the window 28, causes the shutter 41 to re-cover the first 5 in the interest row 36 and again uncover the first 0 in the row 34. Simultaneously, the first number 1 in row 27 on the slider 18 is brought into view at the window 31. This reveals an interest of $10.00 per month on a loan of $2,000 at 6%.

Further movement of the thousands slider 18 operates in a similar manner, each digit increment serving to either uncover a 5 and blank a 0 on the slider 19, or to blank out a 5 and uncover a 0, while simultaneously increasing the number appearing at the $10 window 31, with every other digit increment of principal.

As noted hereinbefore, the rows 37 and 38 are continually blanked out by another shutter 43 attached to (preferably formed integrally with) the tens slider 21. While the shutter 43 does have an elongate window 98 (Fig. 7) capable of being registered with the window 39, the slider 21 is not pulled far enough out during 6% calculations to expose the window 98 to the window 39. The purpose of the shutter 43 will be explained hereinafter in connection with the 5% loan calculations. If only 6% calculations are desired the shutter 43 is not needed.

The hundreds slider 19 is related to the tens slider 21 in the same way that the thousands slider 18 is related to the hundreds slider 19. That is to say, the hundreds slider 19 has secured laterally thereto a shutter 44 which overlies the tens slider 21 and has a plurality of windows 46 which selectively blank and uncover interest numbers that differ by five, on the tens slider 21. Likewise, the tens slider 21 has a shutter 47 which overlies the interest portion of the slider 22. As noted, none of the shutters 41, 44, or 47 covers any portion of the 6% principal rows of numbers 32, 51, or 56.

By way of example, let it be supposed that it is desired to ascertain the monthly interest on a 6% loan of $2,345. The thousands slider 18 is pulled out until the number 2 in the row 23 registers with the window 28. This indicates an interest of $10.00 per month. When the hundreds slider 19 is pulled out until the numeral 3 in the row 32 registers with the window 33, the second of the numerals 1 in the row 34 registers with the window 45 in the shutter 41 and with the window 39. This operation also moves the shutter 44 until the row 48 on the tens slider 21 is seen through the cover window 49 and the shutter window 46. In this case the number 5 in the row 48 will be seen. When the tens slider 21 is moved until the number 4 in the row 51 registers with the window 52 in the cover, it causes the number 5 in row 48 to be replaced by the first number 7 in the row. It also positions the shutter 47 so that the row 53 on the slider 22 is exposed through the cover window 54 and the shutter window 50. Finally, when the number 5 in the row 56 is registered with the window 57, the first number 3 in the row 53 is brought into registry with the windows 54 and 50. Thus the monthly interest on a 6% loan of $2,345 is indicated to be $11.73.

Construction of the calculator to also indicate monthly interest at 5% is more complex. The interest figures indicated by the sliders go up in increments of five. Thus movement of the slider 21 causes the calculator reading to increase in steps or increments of $.05 starting at $.05, $.10, $.15, etc. Similarly, movement of the slider 19 causes the calculator reading to go up in increments of $.50. Likewise the incremental increase in the interest line of windows 29 produced by movement of the thousands slider 18 is $5, going up incrementally through $5.00, $10.00, $15.00, etc. These increments are well suited to calculations of 6% loans because, for example, for each $10 increase in principal, the interest increases $.05. Thus movement of the slider 21 to increase the reading in the principal line 25 in increments of $10 causes the interest reading in the window line 29 to increase in increments of $.05.

To accommodate these interest figures to 5% interest is more complex, because a five cent increase in interest is brought about—not by an increase of $10 in the principal—but by an increase of $12. Similarly, fifty cents interest on a 5% loan is brought about not by $100 principal, as in the case of a 6% loan, but by a principal of $120. The problem then is to distribute the principal numbers which appear at the window line 69 so that the operator is required to position the sliders, in effect, in increments of twelve rather than in increments of ten. This will be illustrated hereinafter.

To accommodate the calculator for 5% loans, each of the sliders 19, 21, and 22 is provided with six separate rows of principal figures, exemplified by the rows 58, 59, 61, 62, 63, and 64 (Fig. 7) on the slider 19. Even this is short of the maximum number that might possibly be required, since there is a certain correspondence between multiples of 10 and multiples of 12. In the general case of providing for any multiplier whatever it might be necessary to provide ten such rows of numbers to accommodate the calculation. As mentioned before, six rows are sufficient here because the number 60 is a common factor to both 12 and 10, and thus it is necessary to provide rows only for the factors: 0, 12, 24, 36, 48, and 60. Starting with 72 the series repeats itself, this being the sum of 60 and 12.

In the case of the 5% principal, the row 24 on the thousands slider 18 is employed instead of the row 23, which is used for the 6% principal. Thus the window 66 of the 5% line 69 in the cover 12 registers only with the row 24.

To accommodate the six rows 58–64 on the hundreds slider 19, the hundreds window 67 in the line 69 is made long enough so that it spans all of the six rows. It is a function of the shutter 41 on the thousands slider 18 to selectively uncover only one of the rows 58–64 at a time, this being done by the windows 68 in the shutter 41.

In the case of a 5% loan, the lowest factor common to both 1000 and 1200 is 6000. Thus the windows 68 in the shutter 41 are so spaced that when the slider 18 is moved to the right, thereby covering the originally visible 0 in the row 64, no other numbers on the slider 19 are uncovered until the number 6 in the row 24 registers with the window 66. At this point the 0 in the row 64 is again uncovered. For any exact thousand-dollar loan between 0 and 6000, it is necessary to move the hundreds slider 19 in order to bring a 0 on one of the rows 58, 59, 61, 62, or 63 into registration. As best seen in Fig. 3, the windows 68 in the shutter 41 are staggered and spaced diagonally across the shutter so that each incremental movement of the slider 18 brings the next adjacent row of figures 58–64 into registry with the elongate window 67 in the cover 12.

Figure 6:
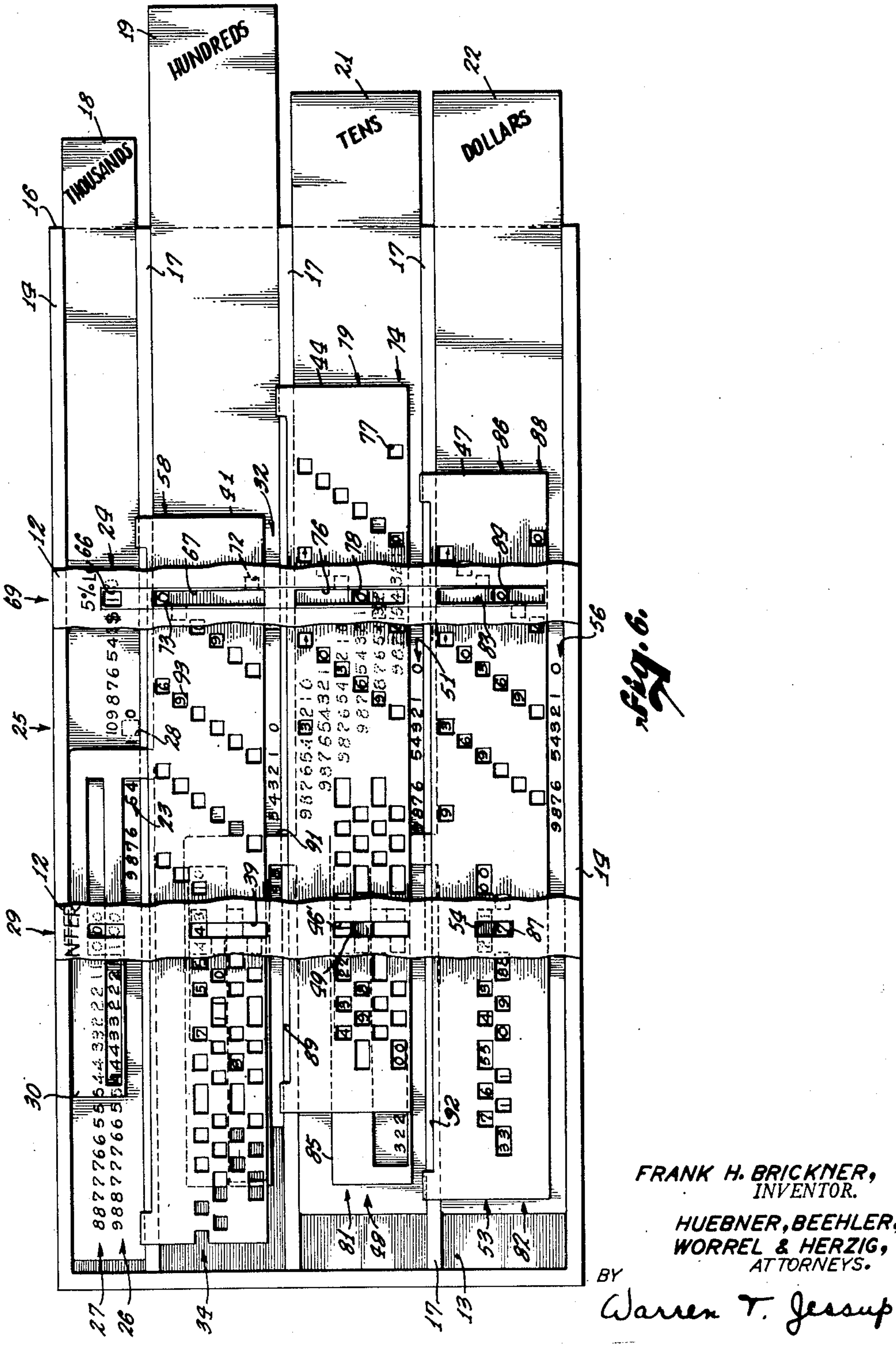
Fig. 6 is a view similar to Fig. 5, illustrating another operation.
Figure 6:
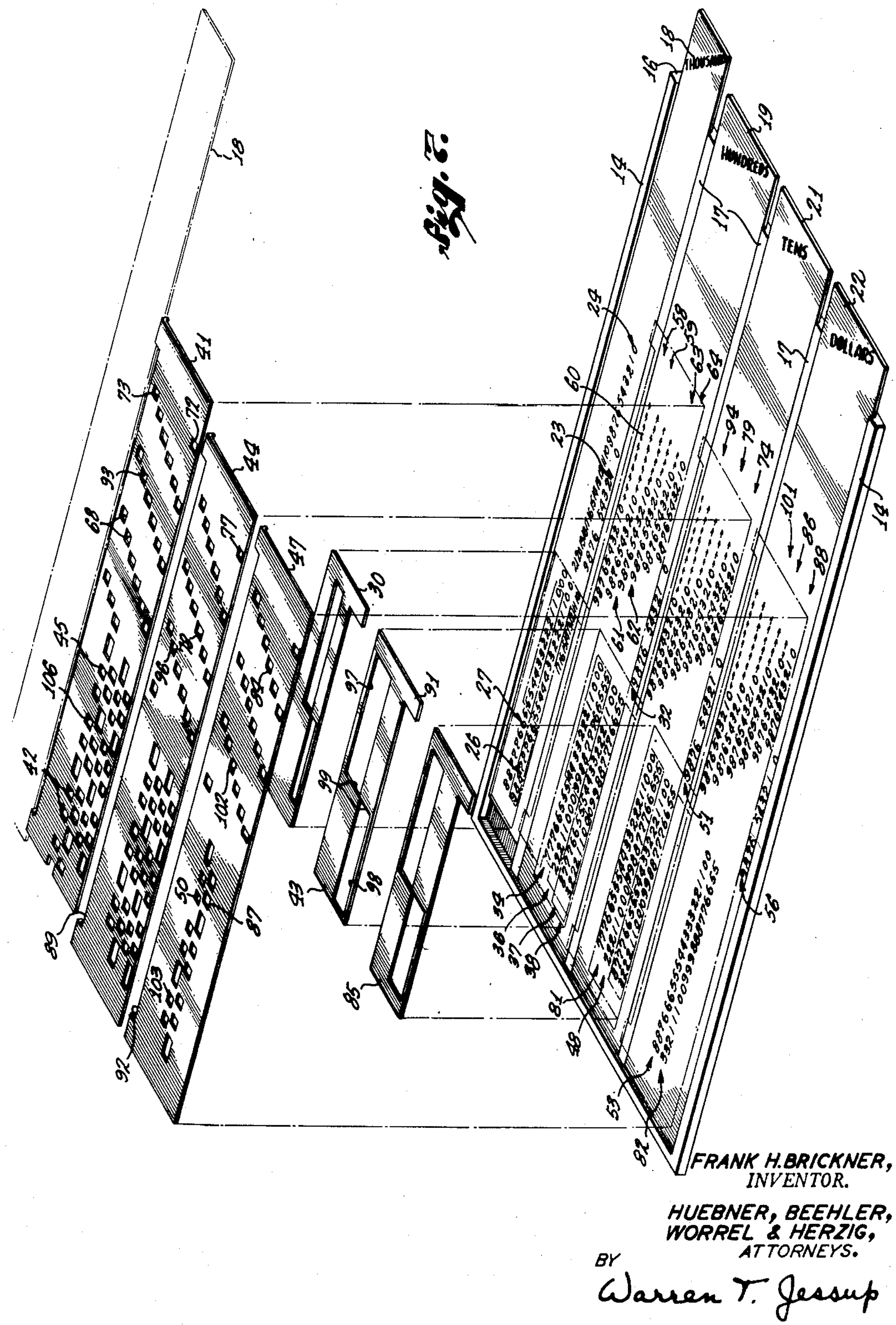

The criteria for spacing the windows in the shutter 41 and for spacing the numbers in the rows 58–64 may be best understood by discussion of a particular example—for instance, the calculation of one month's interest on $1000 at 5% per year, illustrated in Fig. 6.

Starting with all the sliders pushed to the left, the figure $0000 appears in the 5% window line 69. Similarly the interest indicated in the window line 29 is $00.00. When the thousands slider 18 is moved to the right until the numeral 1 in row 24 registers with the window 66, the second 0 in the top interest row 27 is brought into registry with the cover window 31. The associated movement of the shutter 41, secured to the slider 18, causes the first window 71 of the window row 42 overlying the interest row 34 to move one increment to the right. This window 71, however, is two increments wide, so that the row 34 is still exposed through the interest window 39. Thus there have as yet been no changes made in the interest reading by movement of the thousands slider 18 to bring the numeral 1 in the row 24 into registry with the window 66.

Such movement, however, has moved the window 72 in the shutter 41 away from the 0 in the number row 64 and caused the window 73, aligned with the row 58, to register with the cover window 67. With the slider 19 in its left-hand position there is then no number seen through the registered windows 67 and 73—only the face of the slider 19 is seen. It is preferred to mark the slider 19 at this point with a small arrow directed to the right to indicate to the user that the slider 19 must be pulled to the right until a number registers with the windows 67 and 73. Such arrows are placed over the surface of each slider, as shown at 60 in Fig. 7, wherever the slider is to be pulled out to bring a number into registry.

The slider 19 is then pulled to the right until the numeral 0 in the row 58 registers with the windows 73 and 67 as shown in Fig. 6. In this position the first numeral 4 in the interest row 34 has been brought into registry with the windows 39 and 71, so that the interest column now indicates $04.00. $4 per month is the interest payable on a loan of $960 at 5% per year. This leaves $40 to be accounted for.

Movement of the hundreds slider 19 to the position shown in Fig. 6 has caused its associated shutter 44 to now cover up the 0 in the row 74, previously observable through the windows 76 and 77 in the cover 12 and shutter 44, respectively; and has brought the window 78 into registry with the cover window 76. This window 78 is aligned with the number row 79 on the tens slider 21, and in the position thus far explained there is no figure at this point in the row 79. As explained above, a small arrow pointing to the right is marked on the slider 21 to indicate that it must be pulled to the right until a number is observable, this number being the 0 in the row 79 on the slider 21.

With this movement of the slider 21, the second of the numbers 1 in the row 81 on the slider 21 has been brought into registry with the cover window 49 and with the window 46′ in the shutter 44. The interest line of windows 29 now indicates an interest of $04.15, movement of the shutter 47 having shifted the interest reading from the top row 53 to the bottom row 82 on the slider 22. The 5% principal window line 69 now shows $100X, X indicating a small rightwardly directed arrow, as described above, on the slider 22, indicating that the slider 22 must be moved to the right to bring a number into registry with the window 83 in the cover 12 and with the window 84 in the slider 47.

$4.15 is the interest on $996 at 5%; this leaves $4 to be accounted for. This is done by moving the units slider 22 to the right until the 0 in the row 86 registers with the windows 84 and 83. This brings the first number 7 in the row 82 on the slider 22 into registry with the windows 87 and 54. There is thus indicated an interest of $04.17, which is the monthly interest on the $1000 principal now indicated in the 5% line of windows 69.

Thus simply by registering the proper digits in the four columns of the interest line 69, the operator has obtained directly and without any further calculations or slide movements, the interest due—$4.17.

In making these calculations it will be seen that it is necessary to effect manipulation of the calculator in such increments of principal that the interest ends in either 0 or 5. Thus the first factor of principal that was taken care of in the calculations was $960, which calls for a monthly interest of exactly $4.00. The next principal factor which was accommodated was $36, which calls for a monthly interest of fifteen cents. The final four cents was accommodated entirely by the units slider 22.

To further exemplify the manner in which the $1000 principal is broken down into its component parts of 960 plus 36 plus 4, let it be first imagined that the calculator is in the position shown in Fig. 6. The number 0 is seen through the window 83, but this 0 does not represent the proportional or true zero starting point of the units slider 22. By pushing the tens slider 21 in all the way to the left, there is brought into view through the window 83 the number 4 in the row 88 on the slider 22, thus indicating that the actual positioning of the slider 22 is really proportional to the $4 portion of the $1000 principal, and that it has been forced by the shutter 47 to be moved out to make this indication.

Similarly with the sliders in the position shown in Fig. 6, let the hundreds slider 19 be moved in to the left. This now blanks out the 0 in row 79, which was previously visible through the window 76, and brings into view the numeral 4 in the row 74 on the slider 21. This shows that the slider 21 was actually in a position corresponding to $40, this being the first tens digit above $30, and hence proportional to the $36 component of the total. The tens slider 21 was forced outward, in effect, by the interposition of the shutter 44, in order to accommodate this $36 component.

Finally, again starting with the sliders in the position shown in Fig. 6, let the slider 18 be pushed in to the left. This causes the shutter 41 to blank out the 0 previously visible in the row 58, and brings the window 72 in the shutter 41 into registry with the cover window 67. There is no number on the slider 19 now registering with these windows, but it will be noted that the slider 19 is now positioned one increment beyond the numeral 9 in the row 64 (see Fig. 7). Thus in fact, the slider 19 has been moved out a distance proportional to $960.

It is thus seen that the function of the pendent shutters 41, 44, and 47 is to force the next lower slider to be moved out a distance proportional to that portion of the principal which it must account for in the interest line 29.

The example of a $2000 principal at 5% is also useful to illustrate this invention. Assume that the sliders have been positioned so that a principal of $2000 is indicated in the 5% line of windows 69. As pointed out hereinbefore, it is a function of the calculator to, in effect, break down this $2000 principal into increments, each of which calls for an interest ending in either 0 or 5. The first breakdown is effected by the slider 18, which breaks the principal down into $1200 plus $800. The next breakdown is effected by the slider 19, which breaks the $800 into factors of $720 plus $80. The next breakdown is effected by the slider 21, which breaks the $80 down into $72 plus $8.

This may be illustrated by positioning the calculator so that $2000 appears in the principal line 69. The interest reading is $08.33. When the thousands slider 18 is moved fully in, to the left, the reading in the principal line 69 becomes $0800, and the reading in the interest line 29 becomes $03.33. This indicates that previously the thousands slider 18 had actually been positioned to accommodate $1200 of principal, with its corresponding $5 of interest, leaving the remaining $800 for the other three sliders 19, 21, and 22.

When the hundreds slider 19 is moved fully to the left, the reading in the principal line 69 is changed to $0080, and in the interest line 29 to $00.33. This shows that the hundreds slider 19 was actually positioned to accommodate $720 and its corresponding $3 of interest, leaving the remaining $80 to be taken care of by the sliders 21 and 22.

Finally, when the tens slider 21 is moved fully to the left, the reading at the principal line 69 changes to $0008, and the interest line 29 to $00.03. This shows that the slider 21 was actually positioned so as to accommodate $72 of principal with its corresponding thirty cents of interest.

The dollars slider 22 thus took care of $8 of principal, with its corresponding three cents of interest.

Figure 8:
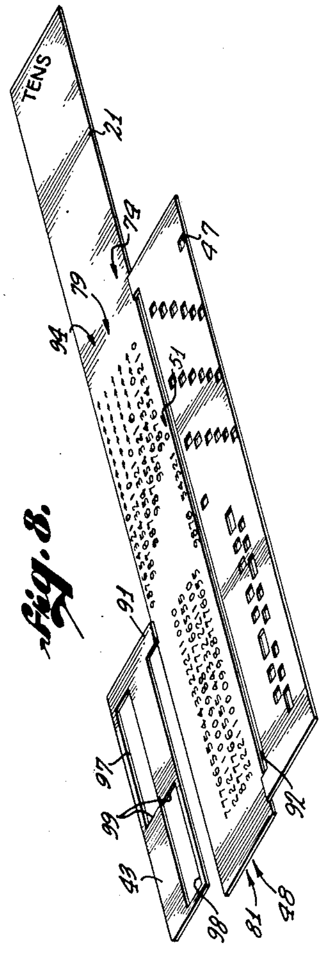
Fig. 8 is an isometric view showing a typical slider with its superjacent shutter, and its pendent subjacent shutter.

Another example will now be considered to show the purpose and function of the upper or superjacent shutters 43, 30, and 85. As best seen in Fig. 8, the superjacent shutter 43 extends laterally to one side of the slider 21, while the pendent shutter 47 extends laterally to the other side thereof. The shutter 43 (Fig. 3) is interposed between the slider 19 and the larger shutter 41 secured to the slider 18. The shutter 43 is accommodated by the formation of a slot 89 along the junction between the slider 19 and its pendent shutter 44. A connecting tab 91 extends between the slider 21 and the shutter 43, passing through the slot 89. The slot 89 has a homologue in the slot 92 between the slider 21 and its pendent shutter 47.

As best seen in Fig. 8, the slider 21, its pendent shutter 47, and its superjacent shutter 43 are preferably formed integral, of one piece of sheet material such as plastic or cardboard, although if desired they may be made separately and secured together.

By way of illustration, another example of use of the calculator will now be discussed. Assume that it is desired to ascertain the monthly interest at 5% on a principal of $8674. The thousands slider 18 is first slid to the right until the 8 in the row 24 appears at the window 66. The principal line 69 now reads $8X00, where X represents a tiny arrow directed to the right. This arrow is in the row 59 on the slider 19 and is visible through the window 93 in the shutter 41. The interest line 29 now reads $30. $30 is the monthly interest, at 5%, on a principal of $7,200. This leaves $1,474 of principal which must be accounted for by the remaining three sliders 19, 21, and 22. The interest on $1474 is $6.14.

The slider 19 is now slid to the right until the numeral 6 in the row 59 registers with the window 67 in the cover 12, and with the window 93 in the shutter 41, which had previously been registered with the window 67 by movement of the slider 18. The principal line 69 now reads $86X0 with X representing a small arrow directed to the right in the row 94 on the slider 21 visible through the window 96 in the shutter 44 and the window 76 in the cover 12. The interest line 29 reads $35.50. This is the monthly interest on a 5% loan of $8,520, leaving $154 which must be accounted for by the remaining sliders 21 and 22.

The monthly interest on $154 at 5% is 64 cents. This added to the present interest standing of $35.50 gives $36.14. We thus know that the final answer must read $36.14, yet the hundreds slider 19 has already been positioned to indicate only $35. Therefore, means must be provided to either force the operator to readjust the hundreds slider 19, or to automatically change the 5, appearing at the window 39, to a 6. Since one of the purposes of this invention is to simplify use of the device to the maximum, the super-shutters 30, 43, and 85 have been provided. It is the function of these shutters, for example the shutter 43, to automatically cause the number appearing at the interest windows, for example the window 39, to be raised by one digit, whenever the calculated interest requires that a number be carried over to the next addition column.

With the sliders 18 and 19 in the positions explained hereinbefore, let the tens slider 21 be slowly slid to the right. When the principal in the window line 69 reads 863X, the point has been reached where no further interest can be indicated properly unless the dollars digit in the interest, i. e., at the window 39 is increased by one. This is because the interest on the next increment, namely on $8,640 is $36.

As the tens slider 21 is pulled further to the right, so that the 3 at the window 76 changes to a 4, the corresponding movement of the shutter 43 causes the upper window 97 (Fig. 7) in the shutter 43 to move out of registry with the cover window 39 and simultaneously brings into registry the lower window 98. This shifts the reading on the slider 19 from the top pair of rows 34 and 36 down to the bottom pair of rows 37 and 38, which, it will be noticed, are in certain cases one digit higher than the corresponding numerals in the top rows 34 and 36. Specifically, in this example, the last of the numerals 5 in the row 34, which was previously visible at the window 39, through the window 106 in the shutter 41, is now blanked out by the shutter 43, and the first of the numerals 6 in the row 37 is brought into view at the window 39 through the window 107 in the shutter 41. Simultaneously the 9 in the row 48 previously visible at the window 49 is now replaced by the adjacent 0 in the row. It is thus seen that the break or transfer from the upper window 97 to the lower window 98 in the shutter 43, as represented by the window edges 99, is directly aligned with the point at which the numerals on the supporting slider 21 shift from 9 to 0 (see Fig. 8).

In this manner, changes in the lower columns of digits as, for example, in the tens column, are reflected back into the hundred column.

Proceeding with the example in question, when the tens slider 21 has been positioned so that the numeral 7 in the row 94 is visible through the window 78 of the cover 12 and through the window 96 of the shutter 44, the principal line 69 reads 867X, where X represents a small rightwardly directed arrow in the row 101 on the slider 22 visible through the window 102 of the shutter 47. The interest in line 29 now reads $36.10, this being the interest due on a 5% loan of $8,664. This leaves $10 which must be accounted for by the units slider 22.

When the units slider 22 is pulled to the right until the numeral 4 in the row 101 is visible at the window 83 through the shutter window 102, the second of the numerals 4 in the interest row 53 on the slider 22 is visible at the window 54 through the window 103 of the shutter 47. This completes the calculation, the interest on $8,674 being, to the nearest cent, $36.14.

The superjacent shutters 30, 43, and 85 are not absolutely necessary to practice important features of the instant invention. If they are not provided, it is merely necessary to mark a small arrow on the slider to indicate that it must be moved one increment to the right in order to bring about an increase of one digit, and thus accommodate the shift discussed above.

The above example of a loan of $8674 at 5% also illustrates (as will any example, for that matter), how the calculator for 5% loans breaks the total principal down into factors divisible by 12, 120, 1200, etc. 8674 is the sum of 7200, 1320, 144, and 10. 7200 is exactly divisible by 1200 and gives an interest of $30; 1320 is exactly divisible by 120 and gives an interest of $5.50; 144 is exactly divisible by 12 and gives an interest of $.60; and 10 is the remainder with an interest of $.04.

With the calculator manipulated to show a reading in the principal line 69 of $8674, the interest indicated is $36.14. If the thousands slider 18 is now pushed fully in, to the left, the reading in the line 69 becomes $0X74, where X indicated a blank; and the interest reading in the line 29 becomes $06.14. By moving the hundreds slider 19 in, to the left, increment by increment, it may be seen that it was actually positioned five increments beyond the numeral 9 in the row 63. This corresponds in distance to the number 14. Thus it is seen that the three sliders 19, 21, and 22 actually take care of $1400 plus $74 or $1474. This $1474, subtracted from the original $8674 shows that the thousands slider was actually taking care of $7200, with its corresponding $30 of interest.

Now when the hundreds slider 19 is pushed in, to the left, the principal reading in the line 69 becomes $00X4, and the interest reading becomes $00.64. The blank space on the slider 21, indicated by the X above, is actually located at a position on the slider 21 six increments beyond the numeral 9 in the row 74. Thus this slider was actually at a distance corresponding to 15. It is therefore seen that the two sliders 21 and 22 have taken care of $150 plus $4 or $154. This $154 subtracted from the $1474 remaining, shows that the slider 19 was actually positioned to accommodate $1320, with its corresponding $5.50 of interest.

When the tens slider 21 is pushed in, to the left, the principal line 69 reads $000X, and the interest line 29 reads $00.04. The blank space corresponding to the X, above, is actually a spot on the slider 22 one increment beyond the numeral 9 in the row 88. This shows that the dollars slider 22 was taking care of $10 of the remaining $154, and that the tens slider 21 was taking care of $144 of that remainder, with its corresponding sixty cents of interest.

Finally, the positioning of the dollars slider 22 at the $10 point shows that it was taking care of only the remaining four cents of interest.

It is on the above outlined principle that the numerals are placed on the sliders 18, 19, 21, and 22, and the windows are cut in the shutters 41, 44, and 47. That is, they are so disposed that the pendent shutters 41, 44, and 47 force the sliders next below to be pulled out a distance proportional to that portion of the principal total which that particular slider is primarily responsible for in the completed interest calculation.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims.

What is claimed is:

1. Calculator comprising a cover having windows therein, a plurality of indicia-bearing sliders disposed side by side for movement beneath said cover so as to selectively register the indicia thereon with said windows, at least one of said sliders having a shutter overlying another slider between said cover and said other slider, said shutter having windows therein registrable with one of said cover windows and with the indicia on said other slider.

2. Calculator comprising a flat cover having a plurality of windows, a plurality of parallel elongate flat sliders disposed side by side and movable longitudinally beneath said cover and having indicia thereon registrable with the windows in said cover, at least one of said sliders having a shutter secured laterally thereto and overlying a slider on one side thereof, said shutter having windows therein registrable with at least one of said cover windows and with the indicia on said last mentioned slider.

3. Calculator comprising a cover having windows therein, a plurality of indicia-bearing sliders disposed for movement beneath said cover so as to selectively register the indicia thereon with said windows, at least one of said sliders having a first shutter overlying a slider on one side thereof between said cover and said last mentioned slider, and a second shutter secured thereto and overlying a slider on the other side thereof between said cover and said last mentioned slider, said shutters having windows therein registrable with said cover windows and with the indicia on the respective sliders which said shutters overlie.

4. Calculator for ascertaining a predetermined function of a variable number, comprising: a flat cover having a plurality of windows; a plurality of parallel, elongate, flat sliders movable longitudinally beneath said cover and having indicia thereon registrable with said windows to indicate through said windows said number and said function; at least one of said sliders having a first shutter secured laterally thereto and overlying a slider on one side thereof, and a second shutter secured secured laterally thereto and overlying a slider on the other side thereof; each of said shutters having windows therein registrable with the windows in said cover and with the indicia on the respective sliders over which said shutters are disposed.

5. Calculator for ascertaining interest on loans, comprising an envelope having a rectangular flat cover and a rectangular flat back spaced therefrom, said cover and back being secured together at three of their adjacent edges, the fourth edge being open, a plurality of spacers secured to said back and interposed between said cover and said back extending from said open edge at right angles thereto, said spacers forming with said cover and back slideways for sliders, a plurality of flat elongate sliders disposed in the slideways formed by said cover back and spacers, said cover having a plurality of windows therein, said sliders having numbers marked thereon registrable wtih the windows in said cover, certain of said sliders having first shutters secured laterally thereto and overlying a slider at one side thereof, and second shutters secured laterally thereto and overlying a slider at the other side thereof, said first and second shutters having windows therein registrable with the windows in said cover and with the numbers on the respective sliders which said shutters overlie.

6. Calculator for ascertaining interest on loans, comprising an envelope having a rectangular flat cover, a rectangular flat back spaced therefrom, said envelope being closed along three of its edges, the fourth edge being open, a plurality of spacers secured to said back and interposed between said cover and said back extending from said open edge at right angles thereto, said spacers forming with said cover and back slideways for sliders, a plurality of flat elongate sliders disposed in the slideways, said cover having at least two groups of windows therein, each group extending across said cover transversely of said sliders, one group constituting principal windows, the other constituting interest windows, each of said sliders having two longitudinal rows of numbers thereon, one row registrable with the principal windows, the other row registrable with the interest windows, at least one of said sliders having a first shutter secured laterally thereto and overlying both the principal and interest rows of numbers on a slider at one side of said one slider, and a second shutter secured laterally thereto and overlying the interest row of numbers on a slider at the other side of said one slider, said first and second shutters having windows therein registrable with the windows in said cover and with the numbers on the respective sliders which said shutters overlie.

7. Calculator comprising a cover having two series of windows therein, one of said window series being that of a number, the other being that of a predetermined function of that number, a plurality of sliders movable beneath said cover, each slider corresponding to a denominational order of the number and having two spaced series of digits thereon, one series being a number series selectively registrable with said number window series, the other being a function series registrable with said function window series, at least one of said sliders having a shutter overlying at least the function series of digits on another slider, said shutter having a plurality of windows registrable with said function series of digits on said other slider.

8. Calculator according to claim 7 wherein said shutter overlies also the number series of digits on said other slider, and has a plurality of windows therein registrable with said number series of digits on said other slider.

9. Calculator comprising a cover having windows therein, a plurality of elongate sliders disposed side by side and movable beneath said cover, each slider corresponding to a denominational order of a number and having digits thereon, at least one of said sliders having a shutter extending laterally therefrom and overlying at least a portion of another slider, said shutter having a plurality of windows registrable with the digits on said other slider.

10. Interest calculator comprising a cover having two series of windows therein, one of said window series being for the principal, the other for the interest; a plurality of sliders movable beneath said cover, each slider corresponding to a denominational order of a principal number and having two spaced series of digits thereon, one series being a principal series selectively registrable with said principal window series, the other being an interest series registrable with said interest window series, at least one of said sliders having a shutter overlying at least the interest digit series on another slider, said shutter having a plurality of windows registrable with said interest digits on said other slider.

11. Interest calculator comprising a cover having two series of windows therein, one of said window series being for the principal, the other for the interest; a plurality of elongate sliders disposed side by side and movable beneath said cover, each slider corresponding to a denominational order of a principal number and having two spaced series of digits thereon, one series being a principal series selectively registrable with said principal window series, the other being an interest series registrable with said interest window series, at least one of said sliders having a shutter extending laterally therefrom and overlying at least the interest digit series on another slider, said shutter having a plurality of windows registrable with said interest digit series on said other slider.

12. Calculator comprising a cover having a plurality of windows therein, at least three sliders disposed and movable side by side beneath said cover, each slider corresponding to a denominational order of a number and having digits thereon, one of said sliders having a shutter extending laterally therefrom and overlying at least a portion of a second slider, said shutter having a plurality of windows registrable with the digits on said second slider, a third slider having a shutter extending laterally therefrom and also overlying said portion of said second slider, said third slider shutter also having a plurality of windows registrable with the digits on said second slider.

FRANK H. BRICKNER.

References Cited in the file of this patent

FOREIGN PATENTS

| Number | Country | Date |
| --- | --- | --- |
| 786,693 | France | June 17, 1935 |